United States Patent
Mauchly

(10) Patent No.: US 9,565,369 B2
(45) Date of Patent: *Feb. 7, 2017

(54) ADAPTIVE SWITCHING OF VIEWS FOR A VIDEO CONFERENCE THAT INVOLVES A PRESENTATION APPARATUS

(71) Applicant: Cisco Technology, Inc., San Jose, CA (US)

(72) Inventor: J. William Mauchly, Berwyn, PA (US)

(73) Assignee: Cisco Technology, Inc., San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/627,493

(22) Filed: Feb. 20, 2015

(65) Prior Publication Data

US 2015/0172562 A1 Jun. 18, 2015

Related U.S. Application Data

(63) Continuation of application No. 13/524,033, filed on Jun. 15, 2012, now Pat. No. 9,001,183.

(51) Int. Cl.
*H04N 7/14* (2006.01)
*H04N 5/262* (2006.01)
*H04N 7/15* (2006.01)

(52) U.S. Cl.
CPC .............. *H04N 5/2628* (2013.01); *H04N 7/15* (2013.01)

(58) Field of Classification Search
CPC ................... H04M 2203/50–2203/509; H04L 12/18–12/1895
USPC ................... 348/14.01–14.16; 370/259–271, 370/351–357; 379/202.01–207.01; 709/201–207, 217–248
See application file for complete search history.

(56) References Cited

U.S. PATENT DOCUMENTS

| | | | |
|---|---|---|---|
| 6,674,458 B1 * | 1/2004 | Cohen-Solal et al. ..... | 348/14.08 |
| 7,496,229 B2 * | 2/2009 | Zhang et al. ................. | 382/176 |
| 7,616,226 B2 * | 11/2009 | Roessler et al. ........... | 348/14.04 |
| 8,094,193 B2 * | 1/2012 | Peterson et al. ............. | 348/169 |
| 8,275,197 B2 * | 9/2012 | Hawkins et al. ............. | 382/165 |
| 9,001,183 B2 * | 4/2015 | Mauchly ...................... | 348/14.1 |

(Continued)

OTHER PUBLICATIONS

Javed, et al., "Video Analytic Algorithm for Handout Extraction from Video Lectures," Canadian Journal on Image Processing & Computer Vision vol. 1, No. 1, Feb. 2010, pp. 1-8.

*Primary Examiner* — Hemant Patel
(74) *Attorney, Agent, or Firm* — Edell, Shapiro & Finnan, LLC

(57) ABSTRACT

Techniques are provided for dynamically adapting the view from a conference endpoint that includes a presentation apparatus, such as a whiteboard. A first signal is received that includes a video signal derived from a video camera that is viewing a room during a conference session in which a person is presenting information on a presentation apparatus. During the video conference, switching is performed between the first signal and a second signal representing content being displayed on the presentation apparatus during the conference session for output and transmission to other conference endpoints of the conference session. The determination as to whether to supply the first signal (for a normal view of the conference room) or the second signal may be based on a position determination of the presenter or may be instead be based on an external view selection command received from another conference endpoint participating in the conference session.

23 Claims, 6 Drawing Sheets

(56) References Cited

U.S. PATENT DOCUMENTS

| | | |
|---|---|---|
| 2003/0103075 A1 | 6/2003 | Rosselot |
| 2004/0236830 A1* | 11/2004 | Nelson et al. ............... 709/204 |
| 2005/0099492 A1 | 5/2005 | Orr |
| 2005/0213731 A1 | 9/2005 | Rodman et al. |
| 2008/0165285 A1 | 7/2008 | Thompson et al. |
| 2010/0037151 A1 | 2/2010 | Ackerman et al. |
| 2010/0245538 A1 | 9/2010 | Marzano et al. |

* cited by examiner

ADAPTIVE SWITCHING OF VIEWS FOR A VIDEO CONFERENCE THAT INVOLVES A PRESENTATION APPARATUS

CROSS-REFERENCE TO RELATED APPLICATION

This application is a continuation of U.S. patent application Ser. No. 13/524,033, filed Jun. 15, 2012, entitled "Adaptive Switching of Views for a Video Conference that Involves a Presentation Apparatus," the entire contents of which are hereby incorporated by reference.

TECHNICAL FIELD

The present disclosure relates to video conferencing systems.

BACKGROUND

In a video conference, a video conferencing display and at least one camera sit at one end of a room, usually in the center of a wall. A whiteboard or other presentation apparatus may be mounted on any of the other three walls of the room. A camera, located on the video conferencing unit, can be pointed at the whiteboard, so that it may be seen on a video display by the remote participants at remote conference endpoints during the video conference while a person (presenter) is making a presentation at the whiteboard. If the whiteboard is on either of the sidewalls, the camera will get a perspective view of the whiteboard, and it will not appear square on the video display for the remote participants.

The camera view of the whiteboard may be severely skewed, since it is perhaps 45 to 60 degrees off axis with respect to the whiteboard. The view can be electronically corrected by an electronic image warping. However if a person (presenter) is in the picture, they will also appear extremely distorted by the image warping.

DESCRIPTION OF EXAMPLE EMBODIMENTS

Overview

Techniques are provided for dynamically adapting the view from a conference endpoint that includes a presentation apparatus, such as a whiteboard, chalkboard, easel pad, etc. A first signal is received that includes a video signal derived from a video camera that is viewing a room during a conference session in which a person is presenting information on a presentation apparatus. The video signal provides a perspective view of the presentation apparatus in the room. It is determined whether the person is outside an operable region with respect to the presentation apparatus. During the video conference, switching is performed between the first signal and a second signal representing content being displayed on the presentation apparatus during the conference session for output and transmission to other conference endpoints of the conference session. When it is determined that the person is outside the operable region with respect to the presentation apparatus, the second signal is selected for output, and when it is determined that the person is inside the operable region with respect to the presentation apparatus, the first signal is selected for output. If the presentation apparatus is an electronic whiteboard, the second signal may be a digital image signal obtained from the electronic whiteboard, or when the presentation apparatus is a traditional whiteboard or easel pad, the second signal is a modified version of the video signal.

Example Embodiments

Figure 1:
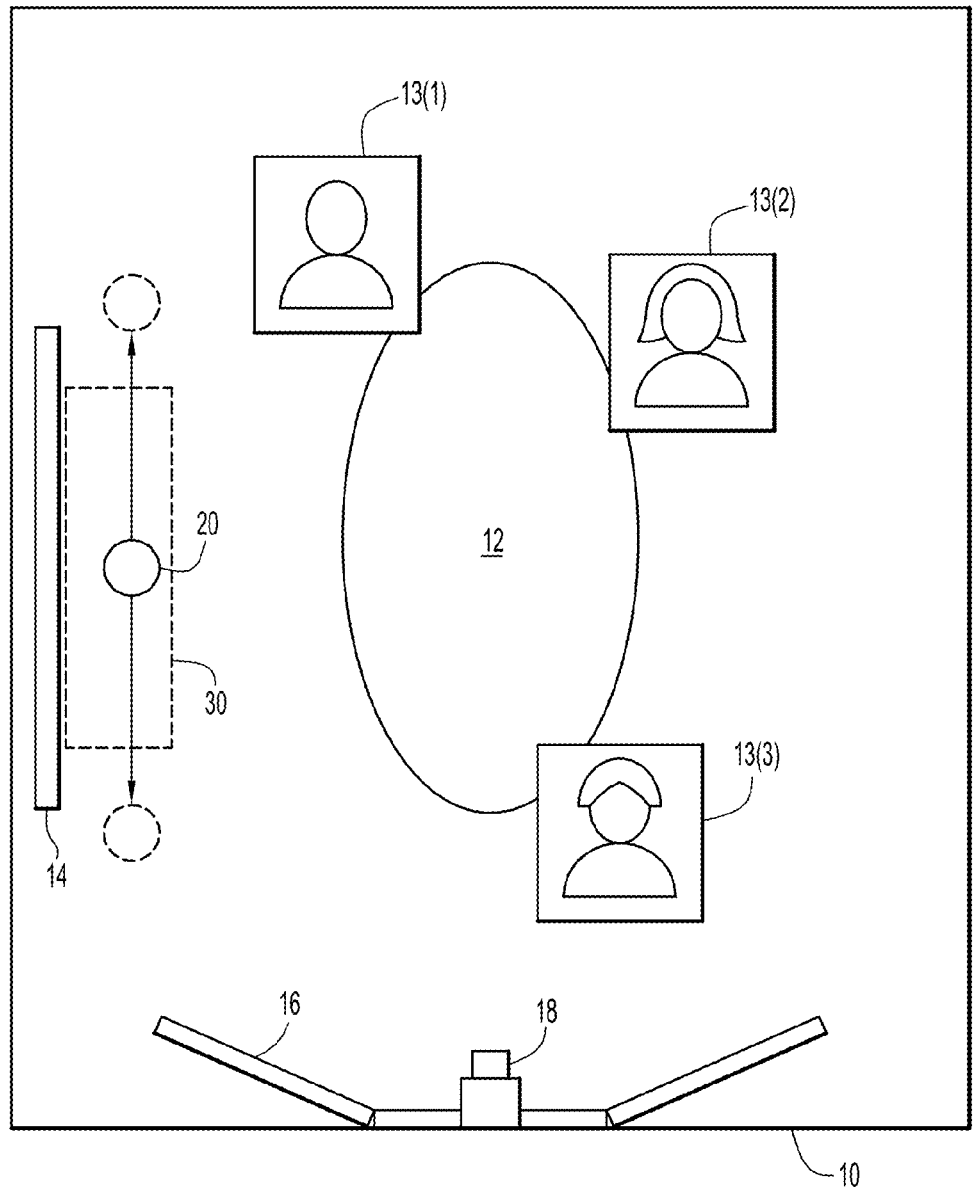
FIG. 1 is a top view of a conference room in which a person is interacting with a presentation apparatus, e.g., a whiteboard, and for which the video supplied as output to the other conference endpoints is dynamically switched according to the techniques described herein.
Figure 2:
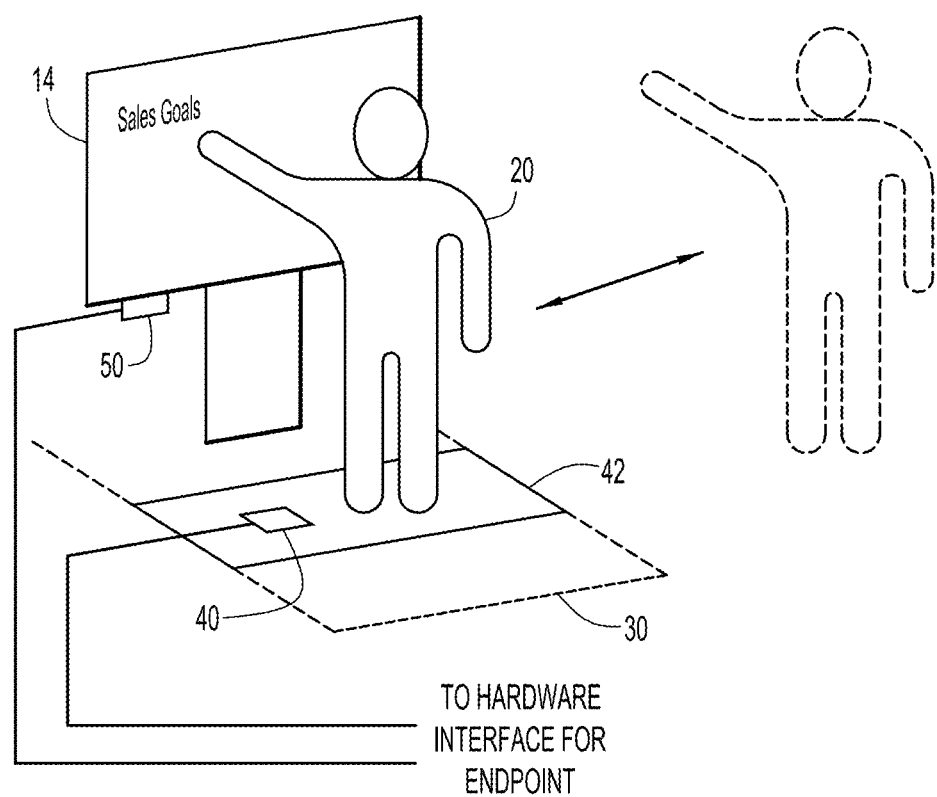
FIG. 2 is a diagram illustrating placement of a proximity sensor and a pressure sensor to detect when a person has moved outside an operable region with respect to the presentation apparatus.

Referring first to FIG. 1, a diagram is shown (from a top view) of a video conference room 10 comprising a conference table around which one or more participants, e.g., participants 13(1), 13(2) and 13(3), maybe sitting. There is a presentation apparatus 14, e.g., a whiteboard, along one wall of the room and a display 16 (comprising one or more display panels) along another wall of the room. Other examples of a presentation apparatus 14 include a digital or electronic whiteboard, chalkboards, easel pads (with multiple sheets of paper), etc. The presentation apparatus 14 is a relatively large standing apparatus that a person physically interacts with during a presentation, and when physically interacting with it, normally blocks a view of the apparatus 14. There is a video camera 18 also positioned to view the room 10. One common position for the camera 18 is aligned with the display 16, as depicted in FIG. 1. The video camera 18 is coupled to other hardware components associated with the video conference endpoint configured to serve the conference room 10. These hardware components are shown in FIG. 2, described below.

FIG. 1 schematically shows at reference numeral 20 a person who is serving as a presenter during a conference session. The presenter 20 usually stands in front of the presentation apparatus 14 to write or draw on the presentation apparatus 14. Depending on the size and particular type of presentation apparatus 14, there is a 30 region in front (and within a certain distance away from the front of) the apparatus 14 that is an operable region. In other words, within this region 30, the person 20 is considered to be able to operably interact with the apparatus 14, i.e., write or draw on the apparatus 14, and outside of this region 30, the person is considered not to be able to use the apparatus 14, and is actually intended to be out of the way so that others can view the content on the apparatus 14. Thus, when the person 20 moves to any position outside the region 30, the person is said to be outside the operable region 30 with respect to the apparatus 14. Examples of positions outside the operable region 30 are shown in phantom in FIG. 1.

When the person is inside the operable region 30, the view of the room captured by the camera 18 should be a perspective view that displays the person 20 interacting with the apparatus 14. When the person 20 moves outside the operable region 30, he/she does this usually with the intent to allow the participants 13(1)-13(3) as well as others at remote video conference endpoints, to see the content written, drawn on or otherwise being displayed by the apparatus 14.

The view of the video camera 18 of the apparatus 14 may be severely skewed, since it is perhaps 45 to 60 degrees off axis with respect to the apparatus 14. In the normal/perspective view of the room 10, it is very difficult to read and understand the content written or drawn on the apparatus 14. The view of the apparatus 14 can be electronically corrected by a digital image warping. However, if the person (presenter) 20 is in the view of the camera, the person will also appear extremely distorted by the image warping.

Accordingly, a mechanism and associated configurations are provided herein to dynamically switch between a video signal that provides a normal perspective view of the conference room 10 and a modified video signal, generated from the video signal from the video camera 18, that represents a processed or rectified view of the apparatus 14, in which rectified view the content on the apparatus 14 it is much easier to read. In other words, in the rectified view, it is as if the camera is viewing the apparatus head-on. The dynamic nature of the switching may be based on real-time determinations of whether the presenter is within the operable region of the apparatus 14 or outside the operable region of the apparatus 14, or based on a view selection command received from another conference endpoint (or generated at the same conference endpoint where the apparatus 14 resides).

When the apparatus 14 is an electronic whiteboard or other similar electronic/digital apparatus that has a display screen that displays content as well as allows a person to interact with the screen (e.g., a touch screen capability) to write or draw, the need to rectify the perspective view of the room captured by the video camera 18 to obtain a head-on view of the content of the whiteboard is not necessary. This is because an electronic whiteboard has a digital output that is a digital image signal generated by the electronic whiteboard for content currently being displayed on the electronic whiteboard. The electronic whiteboard may employ any display technology, such as plasma, liquid crystal display (LCD), or organic light emitting diode (OLED). Thus, the switch operations for a system that has an electronic whiteboard involve switching between the camera view and the digital image signal generated by the electronic whiteboard (which is of naturally a squared heads-on view of the displayed content on the electronic whiteboard). Furthermore, even the perspective view of the room obtained by the video camera can be enhanced using the digital image signal obtained from an electronic whiteboard. For example, the video signal from the video camera 18 can be digitally processed to replace a portion of video frames of the video signal containing content displayed on the electronic whiteboard with a warped version of the digital image signal generated by the electronic whiteboard so that the content displayed on the electronic whiteboard appears in perspective when the (processed) video signal is selected for output (when the person is still standing within the operable region of the electronic whiteboard).

Turning now to FIG. 2, the apparatus 14 is again shown as well as a person 20 who is presenting during a video conference. FIG. 2 shows the person 20 inside the operable region 30 and also, in dotted outline, outside the region 30. There are many ways to detect whether the person is within the operable region 30. For example, two sensors are shown FIG. 2 that may be useful to detect when the person 20 has moved outside of the operable region 30 with respect to the apparatus 14. The first sensor is a pressure sensor 40 or collection of pressure sensors embedded in, for example, a pad or mat 42 that is placed on the floor in front of the apparatus 20 and within the operable region 30. The second sensor is a proximity sensor 50 that operates using any of a variety of technologies, such as infrared, electromagnetic, acoustic, etc., to sense when the person 20 is within the region 30 and when the person is outside the region 30. The proximity sensor 50 may be positioned on the apparatus 14 or at any position determined to accurately detect when the person 20 moves into and out of the operable region 30. There are many types of pressure sensors and proximity sensors that are known in the art that are capable of being used in the system described herein. The sensors 40 and 50 are coupled to appropriate hardware interfaces in the endpoint for the conference room, as described hereinafter in connection with FIG. 3.

In addition, video image analysis may be used to detect the position of the person 20 relative to the apparatus 14, and in particular, relative to the operable region 30. Any one or more of the proximity sensor, pressure sensor, video image analysis, may be used to determine where the person 20 is relative to the operable region 30 associated with the apparatus 14.

Figure 3:
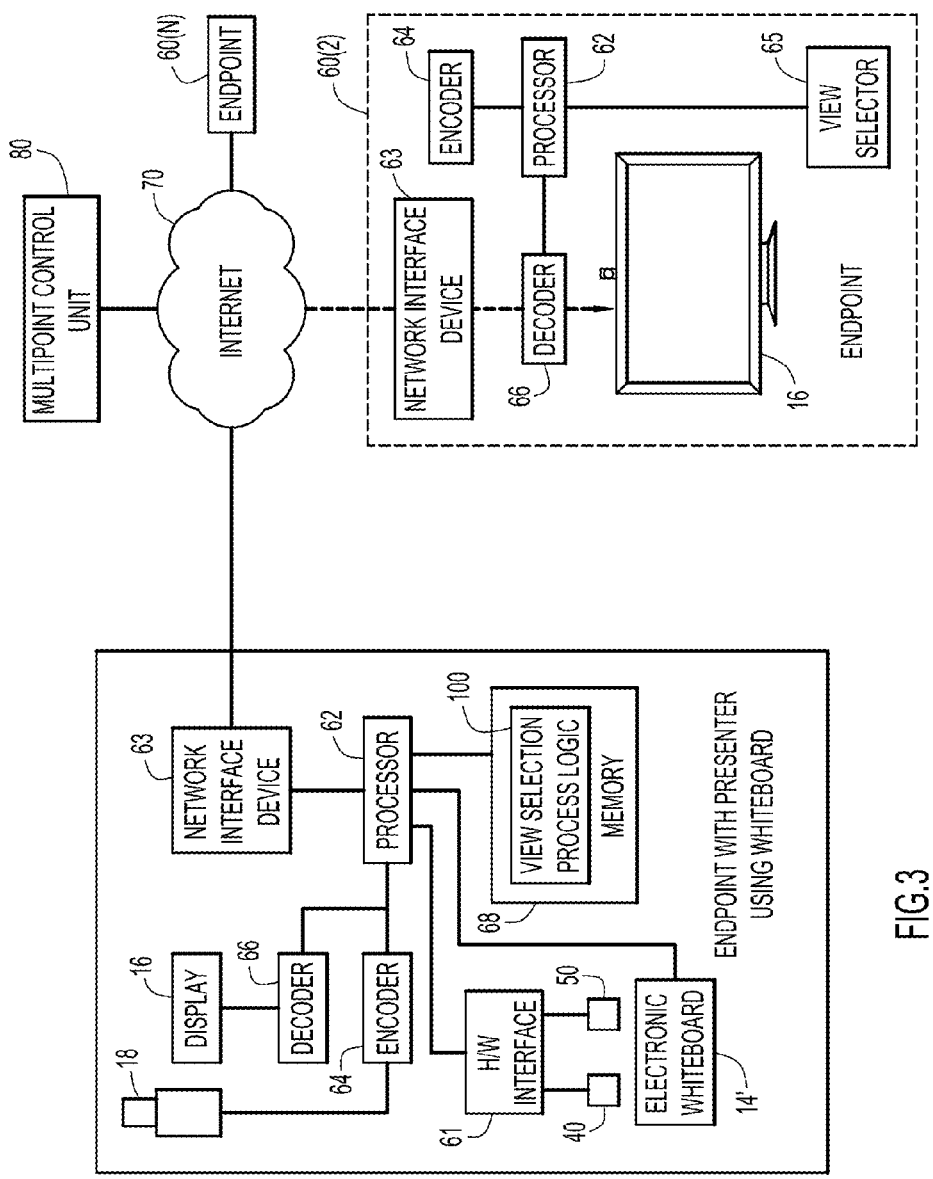
FIG. 3 is a block diagram illustrating multiple endpoints that communicate with each other during a conference session, and one endpoint is configured to dynamically switch video of the conference room where the person is interacting with the presentation apparatus.

Turning to FIG. 3, a block diagram is shown of a conference system that includes a video conference endpoint 60(1) for the conference room 10 that has the presentation apparatus 14 (e.g., whiteboard) as well as other endpoints 60(2)-60(N). Each of the conference endpoints 60(1)-60(N) are coupled to the Internet 70 to communicate with a multipoint control unit 80. Generally, the multipoint control unit 80 receives all the video signals from the respective endpoints and transmits them to each of the other endpoints during a video conference session.

Each of the endpoints 60(1)-60(N) comprises essentially the same components, except that one endpoint, such as endpoint 60(1), is equipped to track the position of a person/presenter in front of a presentation apparatus (e.g., whiteboard) 14. Endpoint 60(1) comprises the display 16, video camera 18, one or both of the pressure (pad) sensor 40 and proximity sensor 50, a hardware (H/W) interface 61 for the sensors 40 and 50, a processor 62, a network interface device 63, an encoder 64, a decoder 66 and memory 68. FIG. 3 shows that the presentation apparatus may be an electronic whiteboard 14'. In this case, the digital video image output of the electronic whiteboard is coupled to the processor 62 for processing as described herein. Depending on a particular implementation, the digital video image output of the electronic whiteboard 14' may be coupled to the encoder 64 for encoding prior to processing by the processor 62.

The H/W interface 61 receives output signals from the sensors 40 and 50 and converts them to digital signals that are suitable for processing the processor 62. The network interface device 63 is a network interface card that enables Ethernet or other type of network connectivity over local area networks and wide area networks, e.g., the Internet 70. The encoder 64 receives a raw video signal from the camera and encodes it, and it may be further processed and formatted by the processor 62 for transmission via the network interface device 63 to the multipoint control unit 80. The decoder 66 decodes an encoded video signal received from the multipoint control unit 80, via the network interface device 63, for output to the display 16.

Endpoints 60(2)-60(N) comprise components similar to that shown for endpoint 60(1), but for simplicity not all of these components are shown in FIG. 2. However, one or more of the endpoints 60(2)-60(N) may include a view selector shown at 65. The view selector 650 is a physical switch or a graphical user interface icon or element that is displayed to participants at endpoint 60(2) to enable a participant at endpoint 60(2) to select or switch between a normal perspective view of the conference room associated with endpoint 60(1) and view of the content displayed on the presentation apparatus in the conference room for endpoint 60(1). Thus, the view selector 65 serves as a manual override, and is described further hereinafter in connection with FIGS. 4-6. Furthermore, while FIG. 3 shows the view selector at endpoint 60(2), it is also possible that a similar view selector function is provided at endpoint 60(1) to allow a participant in the conference room for endpoint 60(1) to manually override any automatic view selection/switching operation.

In endpoint 60(1), the processor 62 performs its various processing operations on video signals and other signals, such as the sensor output signals from the sensors 40 and 50, by executing instructions stored in memory 68. For example, instructions are stored in memory for view selection process logic 100 that, when executed by the processor 62, cause the processor to perform operations to switch between a first signal (that includes the video signal derived from the video camera 18 that is viewing a room during a conference session in which a person is presenting information on a presentation apparatus) and a second signal representing content being displayed on the presentation apparatus during the conference session for output and transmission to other conference endpoints of the conference session. As described herein, the second signal may be, (such as, but not limited to, the case of a traditional whiteboard, easel pad, etc.) a modified video signal that represents a rectified view (head-on) of the presentation apparatus to make the content displayed thereon easy to view, or in the case of an electronic whiteboard, a digital image signal generated by the electronic whiteboard for content displayed on the electronic whiteboard.

In addition, and as alluded to above, the processor 62 in endpoint 60(1) may be configured to analyze video image data output by video camera 18 (either before encoding of after encoding by the encoder 64) to determine whether or not the person 20 is within the operable region with respect to the presentation apparatus 14. Video image analysis techniques to identify the presentation apparatus 14 and then determine the relative position of the person 20 are well within the capabilities of a skilled artisan, and are therefore not described in detail herein.

Memory 68 may comprise read only memory (ROM), random access memory (RAM), magnetic disk storage media devices, optical storage media devices, flash memory devices, electrical, optical, or other physical/tangible memory storage devices. The processor 62 is, for example, a microprocessor or microcontroller that executes instructions for the process logic 100. Thus, in general, the memory 68 may comprise one or more tangible (non-transitory) computer readable storage media (e.g., a memory device) encoded with software comprising computer executable instructions and when the software is executed (by the processor 62) it is operable to perform the operations described herein. In still another form, the operations of the processor 62 may be performed in programmable or fixed digital logic gates in one or more application specific integrated circuits.

Figure 4:
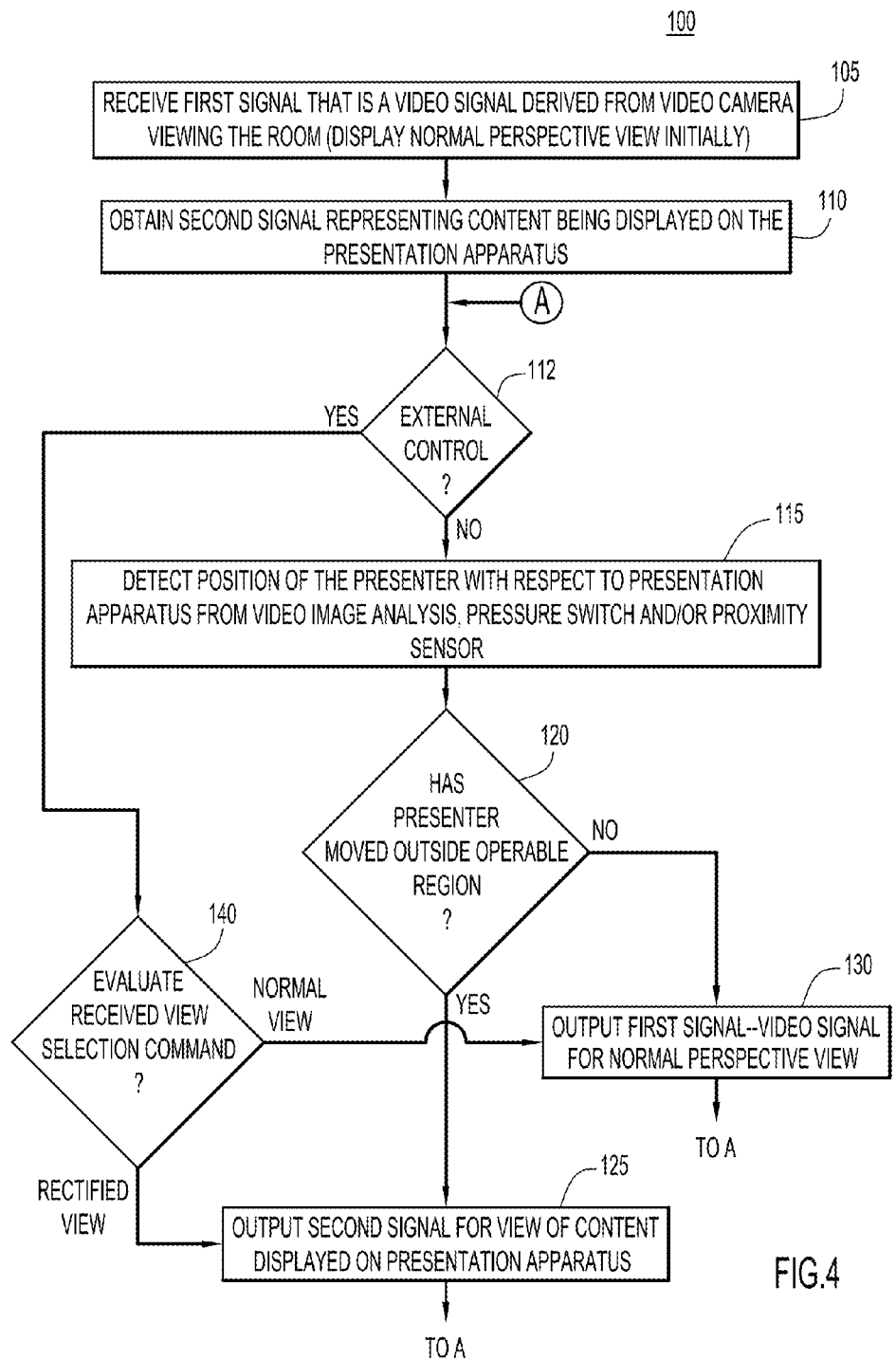
FIG. 4 is a flow chart depicting the operations performed to dynamically switch video of the conference room where the person is interacting with the presentation apparatus.
Figure 5:
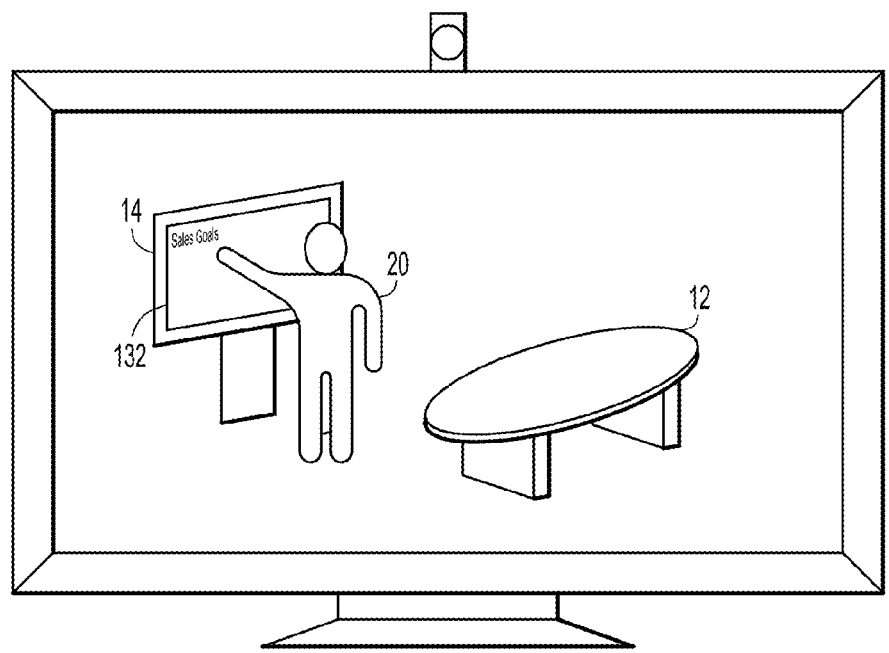
FIG. 5 is an example normal view of the conference room in which the person is interacting with the presentation apparatus and still within the operable region of the presentation apparatus.
Figure 6:
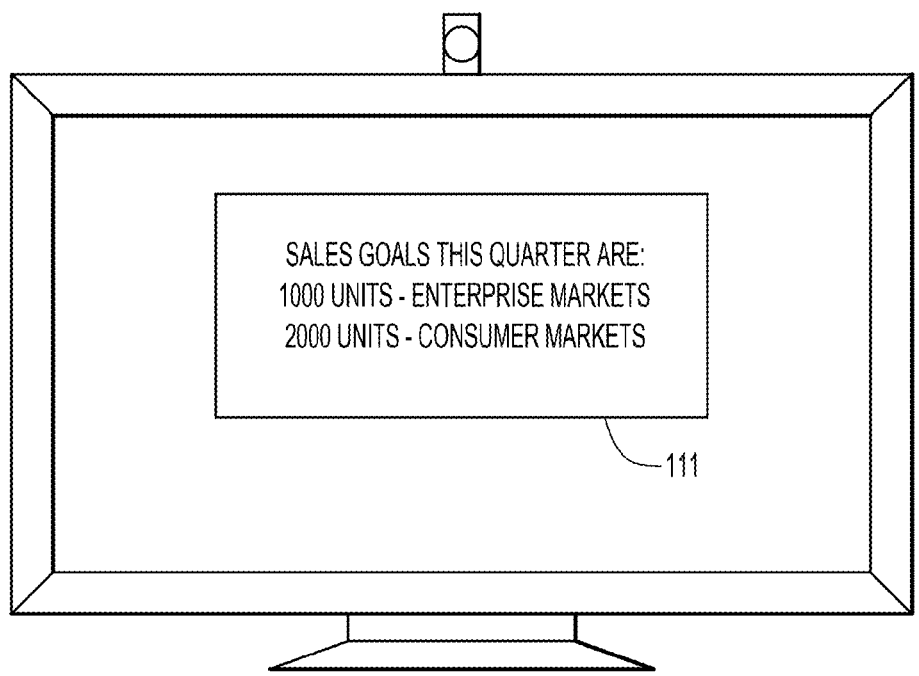
FIG. 6 is an example view of the content displayed on the presentation apparatus that is selected for output when the person interacting with the presentation apparatus has moved outside the operable region of the presentation apparatus.

Reference is now made to FIG. 4, together with FIGS. 5 and 6. FIG. 4 is a flow chart depicting operations performed by execution of the video selection process logic 100, which may be performed either in the endpoint 60(1) or at the multipoint control unit 80, to dynamically switch between a first signal that includes a video signal representing a normal view of the conference room 10 and a second signal representing content being displayed on the presentation apparatus 14 during the conference session for output and transmission to other conference endpoints of the conference session.

Generally, the operations of FIG. 4 involve receiving a first signal that includes a video signal derived from a video camera that is viewing a room during a conference session in which a person is presenting information on a presentation apparatus. During the video conference, switching is performed between the first signal video signal and the second signal for output and transmission to the other conference endpoints of the conference session. As explained hereinafter, the determination as to whether to supply the first signal (for a normal view of the conference room) or the second signal may be based on a position determination for the presenter, or may instead be in the form of an external view selection command received from another conference endpoint participating in the conference session.

More specifically, at 105, a first signal that is received, which is, includes or is derived from a video signal received from a video camera viewing the room, and this video signal provides a normal perspective of the room. It is initially used to be sent to the other conference endpoints for display of a normal perspective view of the room. An example of a normal perspective view of the room is shown in FIG. 5, where the person 20 who is presenting on the apparatus 14 is displayed from the video signal output from the camera viewing the conference room 10 (e.g., as shown in FIG. 1). When the person 20 is standing within an operable region of the apparatus 14 and interacting with the apparatus 14, it is not necessary to see up close the content on the apparatus 14. In this example, a user at an endpoint that receives the video signal for the normal view may see the words "Sales goals" on the apparatus 14.

Referring back to FIG. 4, next, at 110, a second signal representing content being displayed on the presentation apparatus is obtained. The nature of this second signal depends on whether the presentation apparatus 14 is a traditional whiteboard or easel pad, or an electronic whiteboard. When the presentation apparatus is an electronic whiteboard (e.g., electronic whiteboard 14' shown in FIG. 3), the second signal is, or is derived from, a digital image signal generated by the electronic whiteboard for content displayed on the electronic whiteboard. When the presentation apparatus 14 is a traditional whiteboard or easel pad, etc., the second signal is a modified video signal generated by the processor in the endpoint 60(1) (or by a processor in the multipoint control unit 80) from the video signal received or derived from the video camera 18, which modified video signal represents a digitally rectified or warped view of the presentation apparatus 14. There are numerous techniques known to those skilled in the art to digitally process a video signal in order to derive a rectified view of the room so that a head-on view of the presentation apparatus 14 is obtained. The modified video signal represents the rectified view of the presentation apparatus as if viewed substantially head-on by the video camera so that content on the presentation apparatus is easier to read than if the video signal is displayed.

FIG. 6 illustrates an example of content 111 displayed from the second signal, whether it is displayed from the digital image signal generated by an electronic whiteboard or from the modified video signal in the case of a traditional whiteboard or easel pad.

As explained above, there is a manual override capability that may be invoked to allow for manually switching between the first signal (normal view) and the second signal (view of presentation apparatus content). This may be useful because a participant at one of the remote endpoints participating in the conference session may prefer one view over another at any given time regardless of where the presenter is standing. Moreover, a participant at the conference endpoint 60(1) where the presenter is located may want to force a particular view at any given time. Each endpoint sends its video signal to the multipoint control unit (FIG. 3), which in turn transmits it to each of the other endpoints. As shown at 112, a determination is made as to whether a configuration has been set to permit manual override/external control of the switching between the first signal (normal view) and the second signal (view of presentation apparatus content). If is determined at 112 that external control is not enabled, then the next operation is 115 to perform the automatic detection-based switch control of the views.

At 115, the position of the presenter (person 20) with respect to the presentation apparatus 14 is detected, using one or more of video image analysis, pressure (pad) sensor 40 and proximity sensor 50. The goal of operation 115 is to detect a position of the presenter (person 20) with respect to the presentation apparatus, and in particular, to detect whether (or not) the person is outside an operable region with respect to the presentation apparatus. Video image analysis may involve detection motion of the person 20 or position of the person 20 relative to the apparatus 14. The size of the operable region 30 (FIG. 1) may vary depending on the size and type of the apparatus 14, but the dimensions of the operable region 30 is controlled by the placement and sensitivity of one or more of the sensors 40 and 50, and parameters used in the video image analysis, if so employed.

Thus, operation 115 may involve one or more of: analyzing the video signal (from the video camera) to determine whether (or not) the person is outside the operable region with respect to the presentation apparatus; detecting a position of the person with a proximity sensor device to determine whether (or not) the person is outside the operable region with respect to the presentation apparatus; and detecting with a floor pad sensor whether (or not) the person is outside the operable region with respect to the presentation apparatus. Still other sensor devices now known or hereinafter developed may be used for the operation 115. Moreover, operation 115 may also involve detecting that the person has moved back inside the operable region with respect to the presentation apparatus, in which case (and in response thereto), the video signal for the normal view is output (as is evident from the logical flow of FIG. 4, and described hereinafter).

At 120, the output of operation 115 is evaluated. When it is determined that the presenter is outside the operable region with respect to the presentation apparatus 14, at 125, the second signal is selected for output and transmission to the multipoint control unit which in turn transmits it to the other video conference endpoint(s).

Again, FIG. 6 illustrates an example of the view of the content displayed on presentation apparatus 14, and this view may be obtained from the modified video signal in the case of a traditional presentation apparatus or from the digital image signal in the case of an electronic whiteboard. The view of the content as depicted in FIG. 6 makes it very easy to read and understand the content 111 on the apparatus 14. Techniques to generate the modified video signal that represents the rectified view is a result of video signal processing performed to digitally warp the view of the conference room as virtually zoom in (from head-on) a view of the presentation apparatus 14. Techniques to perform this warping operation are known to the skilled artisan and thus described herein. See, for example, "Video Analytic Algorithm for Handout Extraction from Video Lectures," Canadian Journal on Image Processing and Computer Vision, Vol. 1, No. 1, February 2010. It should be further understood that the modified video signal may still generated and used to display the content of an electronic whiteboard when, for example, there is some failure or loss of connectivity with the electronic whiteboard such that the digital image signal generated by the electronic whiteboard is not available.

When it is determined at 120 that the presenter is inside the operable region with respect to the presentation apparatus 14, at 130, the first signal that includes the video signal for the normal perspective view is output for transmission to the multipoint control unit that in turn transmits it to the other video conference endpoint(s)). Again, an example of the displayed output for the video signal for the normal perspective view is shown in FIG. 5.

Furthermore, at 130, in the case when the presentation apparatus 14 is an electronic whiteboard, when displaying the first signal for the normal perspective view, a portion of the video frames of the video signal containing content displayed on the electronic whiteboard is replaced with a warped version of the digital image signal generated by the electronic whiteboard so that the content displayed on the electronic whiteboard appears in perspective view when the first signal is selected for output. In other words, as shown in FIG. 5, the portion 132 of the video frames of the video signal from the video camera 18 that corresponds to or contains the content displayed on presentation apparatus 14 is replaced with the digital image signal (which is digitally warped or rectified into a perspective view) so that the content displayed on the presentation apparatus 14 is perhaps clearer than if take from the camera video signal, but still in perspective to give it a more realistic perspective view.

In this way, the view switches automatically depending on the relative position of the presenting person with respect to the presentation apparatus. While the person is at the presentation apparatus (e.g., whiteboard), or near it, perhaps pointing to it, the normal (unwarped/unrectified) perspective or view is output. When the person steps out of the way of the presentation apparatus, as is normal etiquette in a conference room, a signal representing the content displayed on the presentation apparatus (either generated from the video signal from the video camera or directly from a digital image signal obtained from the presentation apparatus) is selected for output so that the content is easier to view and read for the participants at the remote endpoints.

The far-end participants would see a visible "flip" between a perspective view of the person standing in front of the whiteboard (as in FIG. 5), and a squared-up, close-up view of the presentation apparatus that is easy to read (as in FIG. 6). When the person enters the operable region of the presentation apparatus to draw or write some more, the view would switch back again to the normal view.

FIG. 4 shows that the operation 110 to generate the modified video signal for the rectified view is performed before the detection operation 115 so that it is always available when needed to switch display views. However, this is not meant to be limiting. It may be desirable to generate the modified video signal for the rectified view only after it is determined that the presenter has moved outside the operable region, in other words, after operation 120 and before operation 125.

Moreover, the video signal may be processed to generate the modified video signal to perform other processing functions, such as adjusting one or more of brightness, white balance, contrast, focus, sharpness and de-noise level. For example, whiteboard images may benefit from adjustment of one or more of these settings. People, on the other hand, may look better with other settings, which would be employed for the video signal used for the normal view.

If it is determined at 112 that external control is enabled, then the next operation is operation 140. At operation 140, it is determined when a view selection command has been received. The view selection command may originate from one of the other endpoints involved in the video conference, or even from the same endpoint where the presentation at the whiteboard is occurring. The view selection command is configured to indicate selection of either the first signal (for normal perspective view) video signal or the second signal (for close up heads-on view of the displayed content) for output and transmission to the conference endpoint that generated the view selection command. The multipoint control unit will receive the view selection command and relay it to the video conference endpoint where the presentation is being made. When at 140 a view selection command is received (via the multipoint control unit from the video conference endpoint where it was generated), it is evaluated to determine whether the view selection command is for the normal view or the close-up/heads-on view. When the view selection command is for the close-up/heads-on view, then operation 125 is executed in which the second signal is output for transmission to the multipoint control unit that in turn transmits it to the video conference endpoint(s) to display the close-up view of the displayed content. When the view selection command is for the normal view, the next operation is operation 130 to output the first signal (the video signal from the video camera) for transmission to the multipoint control unit that in turn transmits it to the video conference endpoint(s) for displaying the normal perspective view.

The operations shown in FIG. 4 may be performed at conference endpoint where the presentation apparatus resides. In another form, the operations shown in FIG. 4 may be performed at the multipoint control unit, in which case the relaying the view selection command is not necessary since the multipoint control unit will evaluate the view selection command (if external control is enabled) and output the appropriate video signal for transmission to the other conference endpoint(s). Moreover, when the multipoint control unit performs these operations, the endpoint where the presentation apparatus resides sends the video signal for the normal view of the conference room and the multipoint control unit will receive the digital image signal from an electronic whiteboard or perform the video processing operations to generate the modified video signal for the rectified view (in the case of a traditional presentation apparatus), and will transmit either the first signal (video signal) for the normal view or the second signal to the other endpoints, depending on the position/movement of the presenter or the state of the view selection command is external control is enabled.

In summary, techniques are provided herein to dynamically (automatically or manually) switch, during a video conference, between views of depending on the position of a presenter at a presentation apparatus (e.g., whiteboard, chalkboard, easel pad, etc.). The video signal that is output may be selected based on automatic detection schemes that detect the position of the presenter relative to the presentation apparatus or by manual override selection of a particular view from a participant in the video conference sessions. Participants viewing a display get the option of either of two views, where as previous systems output exclusively one or the other, with no ability to switch between the views as necessary. Again, when a presenter is at the whiteboard, the viewers get perspective and context and an accurate view of the scene. When it is time to look carefully at the content on the whiteboard, the view whiteboard content is provided in a way that makes it easy to read.

The above description is intended by way of example only.

What is claimed is:

1. A method comprising:
   receiving a first signal that includes a video signal derived from a video camera that is viewing a room during a conference session in which a person is presenting information on a presentation apparatus, wherein the video signal provides a perspective view of the presentation apparatus in the room;
   determining whether the person is outside an operable region with respect to the presentation apparatus;
   switching between the first signal and a second signal including content to be displayed on the presentation apparatus during the conference session for output and transmission to other conference endpoints of the conference session, such that when it is determined that the person is outside the operable region with respect to the presentation apparatus, the second signal is selected for output, and when it is determined that the person is inside the operable region with respect to the presentation apparatus, the first signal is selected for output; and
   generating from the video signal a modified video signal representing a rectified view of the presentation apparatus as if viewed substantially head-on by the video camera, wherein the modified video signal is the second signal.

2. The method of claim 1, wherein the presentation apparatus is an electronic whiteboard, and wherein the second signal is, or is derived from, a digital image signal generated by the electronic whiteboard for content displayed on the electronic whiteboard.

3. The method of claim 2, further comprising processing the video signal to replace a portion of video frames of the video signal containing content displayed on the electronic whiteboard with a modified version of the digital image signal generated by the electronic whiteboard so that the content displayed on the electronic whiteboard appears in the perspective view when the first signal is selected for output.

4. The method of claim 1, wherein determining comprises analyzing the video signal to determine whether the person is outside the operable region with respect to the presentation apparatus.

5. The method of claim 1, wherein determining comprises detecting with a proximity sensor whether the person is outside the operable region with respect to the presentation apparatus.

6. The method of claim 1, wherein determining comprises detecting with a pressure sensor whether the person is outside the operable region with respect to the presentation apparatus.

7. The method of claim 1, further comprising:
transmitting the video signal to another conference endpoint;
receiving a view selection command from the other conference endpoint, wherein the view selection command is configured to indicate selection of either the video signal or the modified video signal for output and transmission to a video conference endpoint; and
wherein switching is based on the view selection command instead of the determination as to whether the person is outside the operable region with respect to the presentation apparatus.

8. The method of claim 1, wherein receiving, determining and switching are performed at a video conference endpoint for the room in which the presentation apparatus is located.

9. The method of claim 1, wherein receiving, determining and switching are performed at a multipoint control unit in a video conference system.

10. An apparatus comprising:
a video camera configured to generate a video signal for a view of a room during a conference session in which a person is presenting information on a presentation apparatus, wherein the video signal provides a perspective view of the presentation apparatus in the room; and
a processor configured to:
receive a first signal that includes the video signal;
determine whether the person is outside an operable region with respect to the presentation apparatus;
switch between the first signal and a second signal including content to be displayed on the presentation apparatus during the conference session for output and transmission to other conference endpoints of the conference session, such that when the processor determines that the person is outside the operable region with respect to the presentation apparatus, the processor selects the second signal for output, and when the processor determines that the person is inside the operable region with respect to the presentation apparatus, the processor selects the first signal for output; and
generate a modified video signal representing a rectified view of the presentation apparatus as if viewed substantially head-on by the video camera, wherein the modified video signal is the second signal.

11. The apparatus of claim 10, wherein the presentation apparatus is an electronic whiteboard, and wherein the second signal is, or is derived from, a digital image signal generated by the electronic whiteboard for content displayed on the electronic whiteboard.

12. The apparatus of claim 11, wherein the processor is further configured to process the video signal to replace a portion of video frames of the video signal containing content displayed on the electronic whiteboard with a modified version of the digital image signal generated by the electronic whiteboard so that the content displayed on the electronic whiteboard appears in the perspective view when the first signal is selected for output.

13. The apparatus of claim 10, wherein the processor is configured to analyze the video signal to determine whether the person is outside the operable region with respect to the presentation apparatus.

14. The apparatus of claim 10, and further comprising a proximity sensor coupled to the processor, wherein the proximity sensor is configured to detect whether the person is outside the operable region with respect to the presentation apparatus.

15. The apparatus of claim 10, and further comprising a pressure sensor coupled to the processor, wherein the pressure sensor is configured to detect whether the person is outside the operable region with respect to the presentation apparatus.

16. The apparatus of claim 10, wherein the processor is configured to receive from another conference endpoint a view selection command, wherein the processor is configured to select either the video signal or a modified video signal for output and transmission to the other conference endpoint based on the view selection command instead of the determination as to whether the person is outside the operable region with respect to the presentation apparatus.

17. One or more non-transitory computer readable storage media encoded with software comprising computer executable instructions and when the software is executed operable to:
receive a first signal that includes a video signal derived from a video camera that is viewing a room during a conference session in which a person is presenting information on a presentation apparatus, wherein the video signal provides a perspective view of the presentation apparatus in the room;
determine whether the person is outside an operable region with respect to the presentation apparatus;
switch between the first signal and a second signal including content to be displayed on the presentation apparatus during the conference session for output and transmission to other conference endpoints of the conference session, such that when it is determined that the person is outside the operable region with respect to the presentation apparatus, the second signal is selected for output, and when it is determined that the person is inside the operable region with respect to the presentation apparatus, the first signal is selected for output; and
generate a modified video signal representing a rectified view of the presentation apparatus as if viewed substantially head-on by the video camera, wherein the modified video signal is the second signal.

18. The computer readable storage media of claim 17, wherein the presentation apparatus is an electronic whiteboard, and wherein the second signal is, or is derived from, a digital image signal generated by the electronic whiteboard for content displayed on the electronic whiteboard.

19. The computer readable storage media of claim 18, further comprising instructions operable to process the video signal to replace a portion of video frames of the video signal containing content displayed on the electronic whiteboard with a modified version of the digital image signal generated by the electronic whiteboard so that the content displayed on the electronic whiteboard appears in the perspective view when the first signal is selected for output.

20. The computer readable storage media of claim 17, wherein the instructions operable to determine comprise instructions for analyzing the video signal to determine whether the person is outside the operable region with respect to the presentation apparatus.

21. The computer readable storage media of claim 17, further comprising instructions operable to detect with a proximity sensor whether the person is outside the operable region with respect to the presentation apparatus.

22. The computer readable storage media of claim 17, further comprising instructions operable to detect with a pressure sensor whether the person is outside the operable region with respect to the presentation apparatus.

23. The computer readable storage media of claim 17, further comprising instructions operable to:
- transmit the video signal to another conference endpoint;
- receive a view selection command from the other conference endpoint, wherein the view selection command is configured to indicate selection of either the video signal or a modified video signal for output and transmission to a video conference endpoint,
- wherein the instructions operable to switch are based on the view selection command instead of the determination as to whether the person is outside the operable region with respect to the presentation apparatus.

* * * * *